United States Patent
Weaver et al.

(10) Patent No.: US 9,459,987 B2
(45) Date of Patent: Oct. 4, 2016

(54) METHOD AND SYSTEM FOR COMPARING DIFFERENT VERSIONS OF A CLOUD BASED APPLICATION IN A PRODUCTION ENVIRONMENT USING SEGREGATED BACKEND SYSTEMS

(71) Applicant: Intuit Inc., Mountain View, CA (US)

(72) Inventors: Brett Weaver, San Diego, CA (US); Javier Godinez, Bonita, CA (US); Capen Brinkley, San Diego, CA (US); Thomas Bishop, San Diego, CA (US); M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/966,333

(22) Filed: Dec. 11, 2015

(65) Prior Publication Data

US 2016/0098340 A1    Apr. 7, 2016

Related U.S. Application Data

(63) Continuation of application No. 14/231,141, filed on Mar. 31, 2014, now Pat. No. 9,245,117.

(51) Int. Cl.
*G06F 21/00* (2013.01)
*G06F 11/36* (2006.01)
*G06F 21/55* (2013.01)

(52) U.S. Cl.
CPC .......... *G06F 11/3608* (2013.01); *G06F 11/36* (2013.01); *G06F 11/3612* (2013.01); *G06F 11/3664* (2013.01); *G06F 21/55* (2013.01)

(58) Field of Classification Search
CPC combination set(s) only.
See application file for complete search history.

(56) References Cited

U.S. PATENT DOCUMENTS 5,712,641 A    1/1998    Casabona et al.
5,731,991 A    3/1998    Kinra et al.
(Continued)

FOREIGN PATENT DOCUMENTS

EP    2 541 420    1/2013
WO    WO 02/091182    11/2002
(Continued)

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.
(Continued)

*Primary Examiner* — Ghazal Shehni
(74) *Attorney, Agent, or Firm* — Hawley Troxell Ennis & Hawley LLP; Philip McKay

(57) ABSTRACT

An application is implemented in the production environment in which the application will be used. Two or more backend systems are used to implement different versions of the application using the production environment in which the application will actually be used and accessed. Actual user data is received. A first portion of the actual user data is routed and processed in the production environment using a first version of the application and a first backend system of the two or more backend systems. A second portion of the actual user data is also routed and processed in the production environment but using a second version of the application and a second backend system of the two or more backend systems. The results data is then analyzed to evaluate the various versions of the application in the production environment.

27 Claims, 2 Drawing Sheets

(56) References Cited

U.S. PATENT DOCUMENTS

| | | |
|---|---|---|
| 6,085,224 A | 7/2000 | Wagner |
| 6,205,552 B1 | 3/2001 | Fudge |
| 6,343,236 B1 | 1/2002 | Gibson et al. |
| 6,549,932 B1 | 4/2003 | McNally et al. |
| 6,651,183 B1 | 11/2003 | Gensler et al. |
| 7,114,183 B1 | 9/2006 | Joiner |
| 7,296,261 B2 | 11/2007 | Witchel et al. |
| 7,373,524 B2 | 5/2008 | Motsinger et al. |
| 7,426,745 B2 | 9/2008 | McCarty |
| 7,506,371 B1 | 3/2009 | Ben-Natan |
| 7,552,424 B1 | 6/2009 | Bischof et al. |
| 7,640,458 B2 | 12/2009 | Rao et al. |
| 7,761,923 B2 | 7/2010 | Khuti et al. |
| 7,788,235 B1 | 8/2010 | Yeo |
| 7,792,256 B1 | 9/2010 | Arledge et al. |
| 7,831,570 B2 | 11/2010 | Sack et al. |
| 7,925,527 B1 | 4/2011 | Flam |
| 7,944,355 B2 | 5/2011 | Kumar et al. |
| 7,996,836 B1 | 8/2011 | McCorkendale et al. |
| 8,001,422 B1 | 8/2011 | Sun et al. |
| 8,095,962 B2 | 1/2012 | Condon |
| 8,171,485 B2 | 5/2012 | Muller |
| 8,171,554 B2 | 5/2012 | Elovici et al. |
| 8,181,036 B1 | 5/2012 | Nachenberg |
| 8,281,399 B1 | 10/2012 | Chen et al. |
| 8,312,516 B1 | 11/2012 | Malatesta |
| 8,438,643 B2 | 5/2013 | Wiemer et al. |
| 8,510,821 B1 | 8/2013 | Brandwine et al. |
| 8,555,388 B1 | 10/2013 | Wang et al. |
| 8,561,126 B2 | 10/2013 | Ananthanarayanan et al. |
| 8,561,127 B1 | 10/2013 | Agrawal et al. |
| 8,572,733 B1 | 10/2013 | Rockwood |
| 8,615,785 B2 | 12/2013 | Elrod et al. |
| 8,621,618 B1 | 12/2013 | Ramsey et al. |
| 8,683,585 B1 | 3/2014 | Chen et al. |
| 8,688,820 B1 | 4/2014 | Bhogi et al. |
| 8,726,383 B2 | 5/2014 | Blackwell |
| 8,776,050 B2 | 7/2014 | Plouffe et al. |
| 8,813,225 B1 | 8/2014 | Fuller et al. |
| 8,990,935 B1 | 3/2015 | Cutts |
| 9,047,582 B2 | 6/2015 | Hutchinson et al. |
| 9,049,105 B1 | 6/2015 | Feinstein et al. |
| 9,112,841 B1 | 8/2015 | Brandwine et al. |
| 9,245,117 B2 * | 1/2016 | Weaver .................. G06F 21/55 |
| 9,270,690 B2 | 2/2016 | Kraitsman et al. |
| 2002/0066034 A1 | 5/2002 | Schlossberg et al. |
| 2002/0099992 A1 | 7/2002 | Distler et al. |
| 2002/0116404 A1 | 8/2002 | Cha et al. |
| 2002/0138416 A1 | 9/2002 | Lovejoy et al. |
| 2002/0147803 A1 | 10/2002 | Dodd et al. |
| 2003/0046128 A1 | 3/2003 | Heinrich |
| 2003/0051154 A1 | 3/2003 | Barton et al. |
| 2003/0084327 A1 | 5/2003 | Lingafelt et al. |
| 2003/0088791 A1 | 5/2003 | Porras et al. |
| 2003/0110392 A1 | 6/2003 | Aucsmith et al. |
| 2003/0188191 A1 | 10/2003 | Aaron et al. |
| 2003/0195959 A1 | 10/2003 | Labadie et al. |
| 2003/0233438 A1 | 12/2003 | Hutchinson et al. |
| 2004/0006704 A1 | 1/2004 | Dahlstrom et al. |
| 2004/0181775 A1 | 9/2004 | Anonsen et al. |
| 2004/0237093 A1 | 11/2004 | Sluiman et al. |
| 2004/0249973 A1 | 12/2004 | Alkhatib et al. |
| 2004/0249974 A1 | 12/2004 | Alkhatib et al. |
| 2005/0018618 A1 | 1/2005 | Mualem et al. |
| 2005/0066309 A1 * | 3/2005 | Creamer .............. G06Q 30/018 717/127 |
| 2005/0091304 A1 | 4/2005 | Trayler |
| 2005/0114836 A1 | 5/2005 | Fu |
| 2005/0155013 A1 | 7/2005 | Carrigan |
| 2005/0172162 A1 | 8/2005 | Takahashi et al. |
| 2005/0182969 A1 | 8/2005 | Ginter et al. |
| 2005/0188222 A1 | 8/2005 | Motsinger et al. |
| 2005/0193231 A1 | 9/2005 | Scheuren |
| 2005/0193269 A1 | 9/2005 | Haswell et al. |
| 2005/0204151 A1 | 9/2005 | Fang et al. |
| 2005/0278790 A1 | 12/2005 | Birk et al. |
| 2006/0031407 A1 | 2/2006 | Dispensa et al. |
| 2006/0037077 A1 | 2/2006 | Gadde et al. |
| 2006/0090206 A1 | 4/2006 | Ladner et al. |
| 2006/0101520 A1 | 5/2006 | Schumaker et al. |
| 2006/0184838 A1 | 8/2006 | Singonahalli et al. |
| 2006/0203739 A1 | 9/2006 | Padmanabhan et al. |
| 2006/0293940 A1 | 12/2006 | Tsyganskiy et al. |
| 2007/0027999 A1 | 2/2007 | Allen et al. |
| 2007/0079168 A1 | 4/2007 | Sivakumar et al. |
| 2007/0094711 A1 | 4/2007 | Corley et al. |
| 2007/0180509 A1 | 8/2007 | Swartz et al. |
| 2007/0185875 A1 | 8/2007 | Chang et al. |
| 2007/0250424 A1 | 10/2007 | Kothari |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2009/0007264 A1 | 1/2009 | Chatterjee et al. |
| 2009/0089682 A1 | 4/2009 | Baier et al. |
| 2009/0106838 A1 | 4/2009 | Clark et al. |
| 2009/0199273 A1 | 8/2009 | Yalamanchi |
| 2009/0228973 A1 | 9/2009 | Kumar et al. |
| 2009/0254970 A1 | 10/2009 | Agarwal et al. |
| 2009/0254990 A1 | 10/2009 | McGee |
| 2009/0288078 A1 * | 11/2009 | Makonahalli ............. G06F 8/60 717/174 |
| 2009/0300045 A1 | 12/2009 | Chaudhry et al. |
| 2009/0300423 A1 | 12/2009 | Ferris |
| 2009/0319527 A1 | 12/2009 | King et al. |
| 2010/0020700 A1 | 1/2010 | Kailash et al. |
| 2010/0030544 A1 | 2/2010 | Gopalan et al. |
| 2010/0070964 A1 | 3/2010 | Blumfield et al. |
| 2010/0077203 A1 | 3/2010 | Ogawa et al. |
| 2010/0122317 A1 | 5/2010 | Yadav |
| 2010/0192220 A1 | 7/2010 | Heizmann et al. |
| 2010/0212010 A1 | 8/2010 | Stringer et al. |
| 2010/0217850 A1 | 8/2010 | Ferris |
| 2010/0251363 A1 | 9/2010 | Todorovic |
| 2010/0257580 A1 | 10/2010 | Zhao |
| 2010/0257599 A1 | 10/2010 | Gleichauf |
| 2010/0269121 A1 | 10/2010 | Montesissa et al. |
| 2010/0306354 A1 | 12/2010 | DeHaan et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0047621 A1 | 2/2011 | Brando et al. |
| 2011/0055921 A1 | 3/2011 | Narayanaswamy et al. |
| 2011/0101109 A1 | 5/2011 | Bona et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0208677 A1 | 8/2011 | Zhou et al. |
| 2011/0208797 A1 | 8/2011 | Kim |
| 2011/0238855 A1 | 9/2011 | Korsunsky et al. |
| 2012/0005750 A1 | 1/2012 | Satish |
| 2012/0039336 A1 | 2/2012 | Richmond et al. |
| 2012/0072985 A1 | 3/2012 | Davne et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0151488 A1 | 6/2012 | Arcese et al. |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210437 A1 | 8/2012 | Karande et al. |
| 2012/0233668 A1 | 9/2012 | Leafe et al. |
| 2012/0303776 A1 | 11/2012 | Ferris |
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324572 A1 | 12/2012 | Gordon et al. |

(56) References Cited

U.S. PATENT DOCUMENTS

| | | |
|---|---|---|
| 2012/0324576 A1 | 12/2012 | Clark et al. |
| 2013/0019242 A1 | 1/2013 | Chen et al. |
| 2013/0046667 A1 | 2/2013 | Hill et al. |
| 2013/0054792 A1 | 2/2013 | Sharaf |
| 2013/0055398 A1 | 2/2013 | Li et al. |
| 2013/0067067 A1 | 3/2013 | Miri et al. |
| 2013/0091376 A1 | 4/2013 | Raspudic et al. |
| 2013/0097316 A1 | 4/2013 | Bender et al. |
| 2013/0104237 A1 | 4/2013 | Riley et al. |
| 2013/0117809 A1 | 5/2013 | McDougal et al. |
| 2013/0117852 A1 | 5/2013 | Stute |
| 2013/0125121 A1 | 5/2013 | White |
| 2013/0132854 A1 | 5/2013 | Raleigh et al. |
| 2013/0133072 A1 | 5/2013 | Kraitsman et al. |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227695 A1 | 8/2013 | Shankar |
| 2013/0238786 A1 | 9/2013 | Khesin |
| 2013/0247135 A1 | 9/2013 | Kundu et al. |
| 2013/0276108 A1 | 10/2013 | Blackwell |
| 2013/0276152 A1 | 10/2013 | Hirsch et al. |
| 2013/0291068 A1 | 10/2013 | Huang et al. |
| 2013/0291087 A1 | 10/2013 | Kailash et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |
| 2013/0339514 A1 | 12/2013 | Crank et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0068784 A1 | 3/2014 | Merkow et al. |
| 2014/0074799 A1 | 3/2014 | Karampuri et al. |
| 2014/0082621 A1 | 3/2014 | Fitzgerald et al. |
| 2014/0089204 A1 | 3/2014 | Spies et al. |
| 2014/0096134 A1 | 4/2014 | Barak et al. |
| 2014/0165130 A1 | 6/2014 | Zaitsev |
| 2014/0173738 A1 | 6/2014 | Condry et al. |
| 2014/0189680 A1 | 7/2014 | Kripalani |
| 2014/0214460 A1 | 7/2014 | Rahnama |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0289854 A1 | 9/2014 | Mahvi |
| 2014/0317737 A1 | 10/2014 | Shin et al. |
| 2014/0344933 A1 | 11/2014 | Huh et al. |
| 2015/0032587 A1 | 1/2015 | Broom et al. |
| 2015/0033340 A1 | 1/2015 | Giokas |
| 2015/0052108 A1 | 2/2015 | Volk et al. |
| 2015/0052402 A1 | 2/2015 | Gurumurthy et al. |
| 2015/0095691 A1 | 4/2015 | Edwards |
| 2015/0106939 A1 | 4/2015 | Lietz et al. |
| 2015/0128246 A1 | 5/2015 | Feghali et al. |
| 2015/0128274 A1 | 5/2015 | Giokas |
| 2015/0150123 A1 | 5/2015 | Be'ery et al. |
| 2015/0186641 A1 | 7/2015 | Cabrera et al. |
| 2015/0215327 A1 | 7/2015 | Cabrera et al. |
| 2015/0222647 A1 | 8/2015 | Lietz et al. |
| 2015/0222653 A1 | 8/2015 | Cabrera et al. |
| 2015/0229661 A1 | 8/2015 | Balabine et al. |
| 2015/0269064 A1 | 9/2015 | Bishop et al. |
| 2015/0278517 A1 | 10/2015 | Weaver et al. |
| 2015/0278523 A1 | 10/2015 | Brinkley et al. |
| 2015/0288708 A1 | 10/2015 | Lietz et al. |
| 2015/0304343 A1 | 10/2015 | Cabrera et al. |
| 2015/0312274 A1 | 10/2015 | Bishop et al. |
| 2015/0319177 A1 | 11/2015 | Lietz et al. |
| 2015/0319186 A1 | 11/2015 | Lietz et al. |
| 2015/0347759 A1 | 12/2015 | Cabrera et al. |
| 2015/0347773 A1 | 12/2015 | Bonney et al. |
| 2015/0371044 A1 | 12/2015 | Horne et al. |

FOREIGN PATENT DOCUMENTS

| | | |
|---|---|---|
| WO | WO 2012/135192 | 10/2012 |
| WO | WO 2013/067404 | 5/2013 |
| WO | WO 2015/102776 | 7/2015 |

OTHER PUBLICATIONS

Lietz et al., "Method and System for Creating Enriched Log Data," U.S. Appl. No. 14/139,449, filed Dec. 23, 2013.

Lietz et al., "Method and System for Secure Delivery of Information to Computing Environments," U.S. Appl. No. 14/319,286, filed Jun. 30, 2014.

Cabrera et al., "Method and System for Efficient Management of Security Threats in a Distributed Computing Environment," U.S. Appl. No. 14/319,352, filed Jun. 30, 2014.

Lietz et al., "Method and System for Providing a Virtual Asset Perimeter," U.S. Appl. No. 14/448,281, filed Jul. 31, 2014.

Cabrera et al., "Method and System for Providing Automated Self-Healing Virtual Assets," U.S. Appl. No. 14/448,326, filed Jul. 31, 2014.

\* cited by examiner

METHOD AND SYSTEM FOR COMPARING DIFFERENT VERSIONS OF A CLOUD BASED APPLICATION IN A PRODUCTION ENVIRONMENT USING SEGREGATED BACKEND SYSTEMS

RELATED APPLICATIONS

This application is a continuation of Weaver, et al., U.S. Pat. application Ser. No. 14/231,141, filed on Mar. 31, 2014, entitled "METHOD AND SYSTEM FOR COMPARING DIFFERENT VERSIONS OF A CLOUD BASED APPLICATION IN A PRODUCTION ENVIRONMENT USING SEGREGATED BACKEND SYSTEMS", which is herein incorporated by reference in its entirety.

BACKGROUND

Currently, new applications, new versions of applications, or modifications to existing applications, to be deployed in a cloud-based computing environment are typically tested and/or checked for security vulnerabilities in specially designated testing environments that are distinct from, and often isolated from, the actual production environment in which the new application, new version of an application, or modifications to an existing application, will eventually be run. While testing a new application, a new version of an application, or modifications to an existing application, in a designated testing environment can provide some information about the security, operation, desirability, and reliability of the new application, new version of an application, or modifications to an existing application, testing environments rarely duplicate the actual production environment in any reasonably realistic way. This is particularly true for Internet facing applications and services.

Herein, the term "production environment" includes the various components actually used to deploy, implement, access, and use, a given application as that application is intended to be used. Consequently, production environments typically include multiple components that are combined, communicatively coupled, and/or associated with each other, to provide the production environment. As specific illustrative examples, the components making up a production environment can include, but are not limited to, one or more computing environments used to implement the application in the production environment such as a data center, a cloud computing environment, and/or one or more other computing environments in which one or more components and/or services used by the application in the production environment are implemented; one or more computing systems used to implement the application in the production environment; one or more virtual assets used to implement the application in the production environment; one or more supervisory or control systems, such as hypervisors, used to implement the application in the production environment; one or more communications channels used to implement the application in the production environment; one or more access control systems, such as firewalls and gateways, used to implement the application in the production environment; one or more routing systems, such as routers and switches, used to implement the application in the production environment; one or more communications endpoint proxy systems, such as load balancers or buffers, used to implement the application in the production environment; one or more traffic and/or access control systems used to implement the application in the production environment; one or more databases used to implement the application in the production environment; one or more services used to implement the application in the production environment; one or more backend servers used to implement the application in the production environment; and/or any other components making up an actual production environment in which an application is to be deployed, implemented, and run, and/or accessed, as discussed herein, and/or as known in the art at the time of filing, and/or as developed after the time of filing.

One reason testing environments fail to accurately replicate production environments, and therefore fail to provide a platform to adequately test an application as implemented in a production environment, is that most, if not all, of the components used in a testing environment are not the identical, and/or actual, components used in the production environment. In addition, many of the components used in a production environment are simply not present in a testing environment. This is because the cost of providing all of the components that would be present in a production environment in the testing environment is economically prohibitive and inefficient.

Consequently, using current methods for testing applications deployed in production environments, and particularly Internet facing cloud-based implemented applications, often fail to accurately replicate, or even represent, the actual behavior of the applications once deployed in the production environment.

What is needed is a method and system to accurately test the vulnerabilities, desirability of features, and the behavior/operation of an application, a new version of an application, or modifications to an application, deployed in a cloud-based computing environment using as much of actual production environment to be used by the application, the new version of an application, or the modified application as possible.

SUMMARY

In accordance with one embodiment, a method and system for comparing two versions of a cloud based application in a production environment using segregated backend systems includes implementing a first version of an application and a second version of the application in the same production environment in which the first and second versions of application will actually be used and accessed. In one embodiment, two or more backend systems are used to implement the first and second versions of the application using the same production environment in which the first and second versions of application will actually be used and accessed.

In one embodiment, actual user data is received. In one embodiment, a first portion of the actual user data representing user data from a first portion of users is routed and processed in the production environment by the first backend system of the two or more backend systems using the first version of the application. In one embodiment, a second portion of the actual user data representing user data from a second portion of users is routed and processed in the production environment by a second backend system of the two or more backend systems using the second version of the application.

In one embodiment, the first portion of the actual user data is then processed by the first version of the application in the production environment using the first backend system of the two or more backend systems to transform the first portion of the actual user data into first portion of actual users' results data.

In one embodiment, the second portion of the actual user data is then processed by the second version of the application in the production environment using the second backend system of the two or more backend systems to transform the second portion of the actual user data into second portion of actual users' results data.

In one embodiment, the second portion of actual users' results data is then analyzed to evaluate the production environment and/or operation of the second version of the application in the production environment.

In one embodiment, the first portion of actual users' results data and the second portion of actual users' results data are also analyzed and/or compared to evaluate the production environment and/or operation, and/or desirability of features, of the first version of the application and the second version of the application, as implemented in the production environment.

Figure 1:
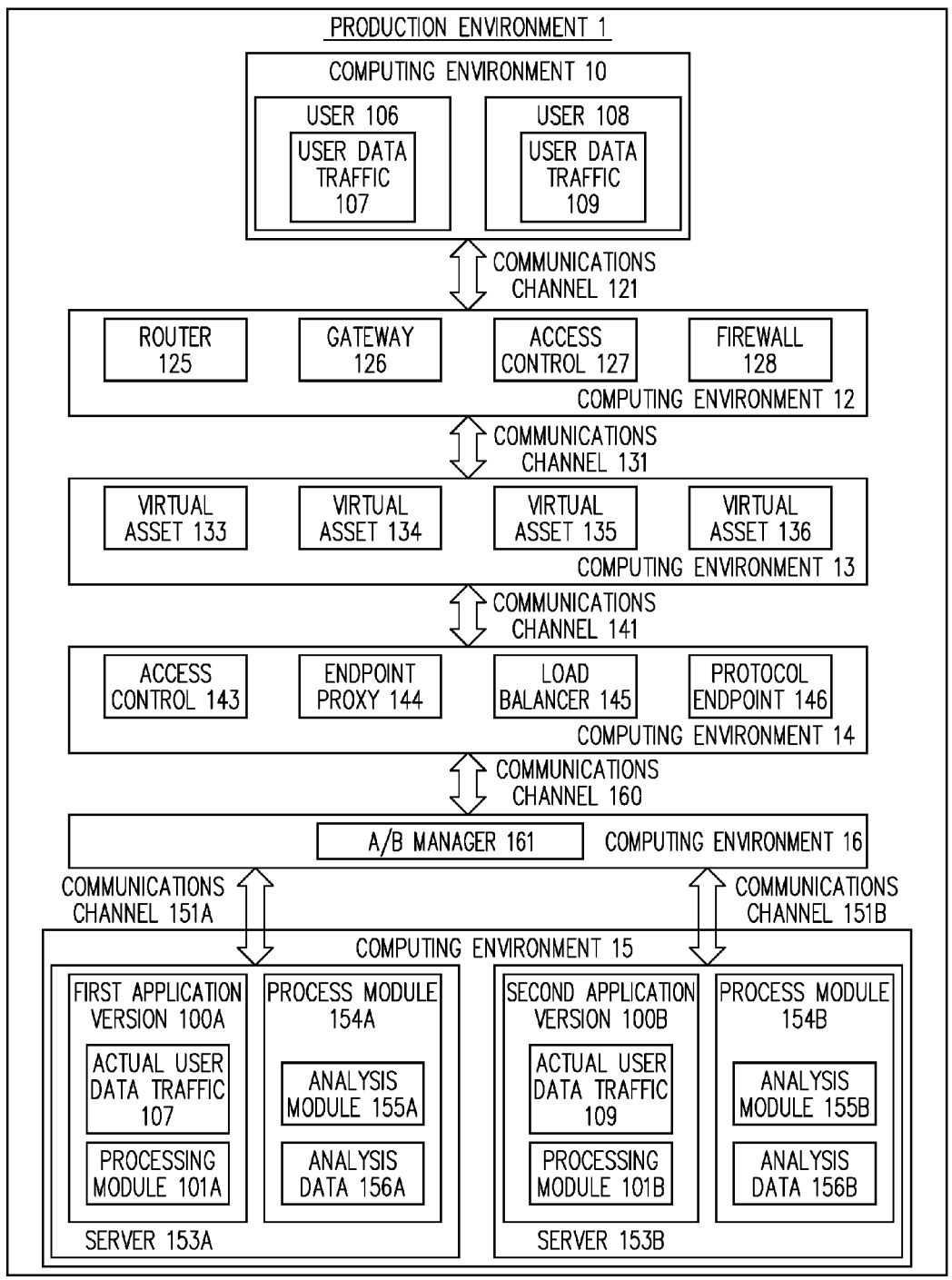
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for comparing two versions of a cloud based application in a production environment using segregated backend systems includes a process for comparing two versions of a cloud based application in a production environment using segregated backend systems implemented, at least in part, by one or more computing systems and/or computing entities in a production environment.

Herein, the term "production environment" includes the various components actually used to deploy, implement, access, and use, a given application as that application is intended to be used. In various embodiments, production environments include multiple production environment components that are combined; communicatively coupled; virtually and/or physically connected; and/or associated with one another, to provide the production environment implementing the application.

As specific illustrative examples, the production environment components making up a given production environment can include, but are not limited to, one or more computing environments used to implement the application in the production environment such as a data center, a cloud computing environment, and/or one or more other computing environments in which one or more components and/or services used by the application in the production environment are implemented; one or more computing systems or computing entities used to implement the application in the production environment; one or more virtual assets used to implement the application in the production environment; one or more supervisory or control systems, such as hypervisors, used to implement the application in the production environment; one or more communications channels used to implement the application in the production environment; one or more access control systems, such as firewalls and gateways, used to implement the application in the production environment; one or more routing systems, such as routers and switches, used to implement the application in the production environment; one or more communications endpoint proxy systems, such as load balancers or buffers, used to implement the application in the production environment; one or more traffic or access control systems used to implement the application in the production environment; one or more secure communication protocols and/or endpoints, such as Secure Sockets Layer (SSL) protocols, used to implement the application in the production environment; one or more databases used to implement the application in the production environment; one or more internal or external services used to implement the application in the production environment; one or more backend systems, such as backend servers or other hardware used to implement the application in the production environment; one or more software systems used to implement the application in the production environment; and/or any other components making up an actual production environment in which an application is to be deployed, implemented, accessed, and run, as discussed herein, and/or as known in the art at the time of filing, and/or as developed after the time of filing.

As used herein, the terms "computing system" and "computing entity", include, but are not limited to, a virtual asset; a server computing system; a workstation; a desktop computing system; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple virtual assets; server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, the one or more computing systems and computing entities included in the production environment and/or implementing the processes for testing cloud based applications and services in a production environment using segregated backend systems are logically or physically located, and/or associated with, two or more computing environments. As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the components, infrastructure, communication and networking systems, and security systems associated with the computing systems and/or virtual assets making up the trusted computing environment, are either under the control of, or known to, a party. In contrast, unknown, or untrusted computing environments are environments and systems where the components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, an application and/or any computing systems and/or virtual assets, and/or networks of computing systems and/or virtual assets, associated with, known by, and/or controlled by, an application. Examples of untrusted computing environments include, but are not limited to, public networks, such as the Internet, various cloud-based computing environments, and various other forms of distributed computing systems.

It is often the case that an application needs to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more computing systems and/or virtual assets, and/or two or more computing environments, in the production environment are connected by one or more communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more computing systems and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, the production environment includes one or more cloud computing environments. In various embodiments, the cloud computing environments can be any form of cloud computing environment, such as, but not limited to, a public cloud; a private cloud; a virtual private network (VPN); a subnet; a Virtual Private Cloud, or VPC; a sub-net or any security/communications grouping; or any other cloud-based infrastructure, sub-structure, or architecture, as discussed herein, and/or as known in the art at the time of filing, and/or as developed after the time of filing.

In many cases, a given application or service provided through the production environment may utilize, and interface with, multiple cloud computing environments, such as multiple VPCs, in the course of providing the associated service. In various embodiments, each cloud computing environment includes allocated virtual assets associated with, and controlled or used by, the party utilizing the cloud computing environment.

FIG. 1 is a functional diagram of the interaction of various elements associated with exemplary embodiments of the methods and systems for comparing different versions of a cloud based application in a production environment using segregated backend systems discussed herein. Of particular note, the various elements in FIG. 1 are shown for illustrative purposes as being associated with production environment 1 and specific computing environments within production environment 1, such as computing environments 10, 12, 13, 14, 15 and 16. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components, as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center, a party and/or entity providing all or a portion of a cloud-based computing environment, the owner or a provider of an application or service, the owner or provider of one or more resources, and/or any other party and/or entity providing one or more functions, and/or any other party and/or entity as discussed herein, and/or as known in the art at the time of filing, and/or as made known after the time of filing.

In accordance with one embodiment, a first version of an application is implemented in the production environment in which the first version of the application will be, or is, actually deployed, implemented, accessed, and used, as that first version of the application is intended to be used.

In accordance with one embodiment, a second version of the application is implemented in the production environment in which the second version of the application will be, or is, actually deployed, implemented, accessed, and used, as that second version of the application is intended to be used.

Consequently, in one embodiment the first and second versions of the application are implemented in the production environment to utilize all of the production environment components that are combined; communicatively coupled; virtually and/or physically connected; and/or associated with one another, to provide the production environment implementing the first and second versions of the application.

As specific illustrative examples, the first and second versions of the application are implemented using, and including, the actual production environment components such as, but not limited to, the one or more computing environments to actually be used to implement the first and second versions of the application in the production environment such as a data center, a cloud computing environment, and/or one or more other computing environments in which one or more components and/or services to actually be used to implement the first and second versions of the application in the production environment are implemented; the one or more computing systems or computing entities to actually be used to implement the first and second versions of the application in the production environment; the one or more virtual assets to actually be used to implement the first and second versions of the application in the production environment; the one or more supervisory or control systems, such as hypervisors, to actually be used to implement the first and second versions of the application in the production environment; the one or more communications channels to actually be used to implement the first and second versions of the application in the production environment; the one or more access control systems, such as firewalls and gateways, to actually be used to implement the first and second versions of the application in the production environment; the one or more routing systems, such as routers and switches, to actually be used to implement the first and second versions of the application in the production environment; the one or more communications endpoint proxy systems, such as load balancers or buffers, to actually be used to implement the first and second versions of the application in the production environment; the one or more traffic and/or access control systems to actually be used to implement the first and second versions of the application in the production environment; the one or more secure communication protocols and/or endpoints, such as Secure Sockets Layer (SSL) protocols, to actually be used to implement the first and second versions of the application in the production environment; the one or more databases to actually be used to implement the first and second versions of the application in the production environment; the one or more internal or external services to actually be used to implement the first and second versions of the application in the production environment; the one or more backend servers or other hardware to actually be used to implement the first and second versions of the application in the production environment; the one or more software systems to actually be used to implement the first and second versions of the application in the production environment; and/or any other components making up the actual production environment in which the first and second versions of the application are to be deployed, implemented, and run, as discussed herein, and/or as known in the art at the time of filing, and/or as developed after the time of filing.

In various embodiments, the first and second versions of the applications represent two different, but similar, applications. In various embodiments, the first and second versions of the application represent two different releases/versions of an application each having different feature sets. In various embodiments, the first and second versions of the application represent a first, older, version of an application and a second, newer, or modified, version of the application, each having different feature sets. In various embodiments, the first and second versions of the applications represent any two applications that differ in one or more respects/aspects, as discussed herein, and/or as known in the art at the time of filing, and/or as identified after the time of filing.

In addition, while herein embodiments including two versions of an application are discussed, those of skill in the art will readily recognize that, in various embodiments, any number of versions of an application can be accommodated and benefit from the use of the methods and systems for comparing different versions of a cloud based application in a production environment using segregated backend systems.

As noted above, FIG. 1 is a functional diagram of the interaction of various elements associated with one embodiment of the methods and systems for comparing different versions of a cloud based application in a production environment using segregated backend systems discussed herein. In particular, FIG. 1 shows two versions of a given application, e.g., first application version 100A implemented in production environment 1 on server 153A and first application version 100B implemented in production environment 1 on server 153B.

As seen in FIG. 1, in this specific illustrative example, first and second application versions 100A and 100B are implemented using, and including, the actual production environment components such as, but not limited to, the one or more computing environments, e.g., computing environments 10, 12, 13, 14, 15, and 16 to actually be used to implement first and second application versions 100A and 100B in production environment 1, such as a data center, a cloud computing environment, and/or one or more other computing environments in which one or more components and/or services to actually be used to implement first and second application versions 100A and 100B in production environment 1 are implemented As seen in FIG. 1, production environment 1 includes computing environment 10, for instance a local area network, or the Internet, that includes actual users 106 and 108 generating user data traffic 107 and 109, respectively, using one or more computing systems. As seen in FIG. 1, user data traffic 107 and 109 is provided to computing environment 12, such as an access layer or Internet Service Provider (ISP) service used to access first and second application versions 100A and 100B, via communications channel 121.

As seen in FIG. 1, production environment 1 includes computing environment 12 which, in turn, includes, as illustrative examples, one or more of router 125, gateway 126, access control 127, and firewall 128. As seen in FIG. 1, in this specific illustrative example, computing environment 12 is commutatively coupled to computing environment 13 of production environment 1 by communications channel 131.

In the specific illustrative example of FIG. 1, computing environment 13 of production environment 1 is a cloud computing environment and includes various virtual assets 133, 134, 135, and 136 used to implement first and second application versions 100A and 100B.

In the specific illustrative example of FIG. 1, production environment 1 includes computing environment 14, such as an access control layer, commutatively coupled to computing environment 13 by communications channel 141. In this specific illustrative example, computing environment 14 includes exemplary access control systems such as one or more of access control 143, endpoint proxy 144, load balancer 145, and protocol endpoint 146.

In the specific illustrative example of FIG. 1, production environment 1 includes computing environment 16 and A/B manager 161 commutatively coupled to computing environment 14 by communications channel 160. As discussed below, in one embodiment, A/B manager 161 routes a first portion of actual user data, such as user data traffic 107, to first application version 100A and server 153A. Likewise, in one embodiment, A/B manager 161 routes a second portion of actual user data, such as user data traffic 109, to second application version 100B and server 153B.

As seen in the specific illustrative example of FIG. 1, production environment 1 includes computing environment 15, such as a data center or infrastructure provider environment, commutatively coupled to A/B manager 161 by communications channels 151A and 151B. In this specific illustrative example, computing environment 15 includes server 153A associated with first application version 100A and server 153B associated with second application version 100B.

In the specific illustrative example of FIG. 1, A/B manager 161 routes a first portion of actual user data, such as user data traffic 107, to first application version 100A and server 153A where the first portion of actual user data, such as user data traffic 107, is processed using first application version 100A and server 153A to generate first users' results data 102A.

In the specific illustrative example of FIG. 1, A/B manager 161 routes a second portion of actual user data, such as user data traffic 109, to second application version 100B and server 153B where the second portion of actual user data, such as user data traffic 109, is processed using second application version 100B and server 153B to generate second users' results data 102B.

As noted above, with the exception of the two backend systems, e.g., servers 153A and 153B, both the first and second versions of the application, e.g., first application version 100A and second application version 100B are implemented in production environment 1 which is the actual production environment in which first application version 100A and second application version 100B will be, or are, actually deployed, implemented, accessed, and used, as first application version 100A and second application version 100B are intended to be used.

In one embodiment, actual user data traffic is received in the production environment.

As used herein the term "user" includes any party, parties, and/or entities, including computing systems, computing entities, other applications, software, and/or hardware, and/or any other data source, as discussed herein, and/or as known in the art at the time of filing, and/or as developed after the time of filing, from which data is obtained for processing by an application.

In one embodiment, a first portion of the actual user data traffic representing user data from a first subset of users is routed to the first version of the application and a first backend system of the two or more backend systems for processing.

In one embodiment, the first portion of the actual user data traffic is determined based on one or more routing factors such as, but not limited to, an actual user type associated with the actual user data traffic; an actual user location associated with the actual user data traffic; an IP address associated with the actual user data traffic; header data included in the actual user data traffic; a status of an actual user associated with the actual user data traffic, and/or any other routing factors, or combination of routing factors, as discussed herein, and/or as known in the art at the time of filing, and/or as developed after the time of filing.

In one embodiment, a second portion of the actual user data traffic representing user data from a second subset of users is routed to the second version of the application and a second backend system of the two or more backend systems for processing.

In one embodiment, the second portion of the actual user data traffic is distinct from the first portion of the actual user data traffic.

In one embodiment, the second portion of the actual user data traffic is determined based on one or more routing factors such as, but not limited to, an actual user type associated with the actual user data traffic; an actual user location associated with the actual user data traffic; an IP address associated with the actual user data traffic; header data included in the actual user data traffic; a status of an actual user associated with the actual user data traffic, and/or any other routing factors, or combination of routing factors, as discussed herein, and/or as known in the art at the time of filing, and/or as developed after the time of filing.

As seen in the specific illustrative example of FIG. 1, production environment 1 includes computing environment 15, such as a data center or infrastructure provider environment, commutatively coupled to A/B manager 161 by communications channels 151A and 151B. In this specific illustrative example, computing environment 15 includes server 153A associated with first application version 100A and server 153B associated with second application version 100B.

As noted above, in the specific illustrative example of FIG. 1, production environment 1 includes computing environment 16 and A/B manager 161 commutatively coupled to computing environment 14 by communications channel 160. In one embodiment, A/B manager 161 routes a first portion of actual user data traffic, such as user data traffic 107, to first application version 100A and server 153A. Likewise, in one embodiment, A/B manager 161 routes a second portion of actual user data traffic, such as user data traffic 109, to second application version 100B and server 153B.

In one embodiment, the first portion of the user traffic is then processed in the production environment using the first version of the application. In one embodiment, as a result of the processing by the first version of the application in the production environment, the first portion of the actual user data is transformed into first users' results data. That is to say, the first portion of the actual user data is processed by the first version of the application in the production environment, and using each of the identical and actual production environment components used by the first version of the application to process any user data.

As a specific illustrative example, in the case where the application is a financial management system, the first portion of the actual user data is processed by the first version of the application to produce first user results data, in one embodiment, in the form of the one or more specific financial reports generated using the first portion of the actual user data. As another specific illustrative example, in the case where the application is a tax preparation system, the first portion of the actual user data is processed by the first version of the application to transform the first portion of the actual user data into first results data taking the form, in this specific illustrative example, of one or more completed tax filing forms, such as a 1040 tax form.

In the specific illustrative example of FIG. 1, A/B manager 161 routes a first portion of actual user data, such as user data traffic 107, to first application version 100A and server 153A where the first portion of actual user data, such as user data traffic 107, is processed using first application version 100A and server 153A to generate first users' results data 102A.

As seen in FIG. 1, processing module 101A of first application version 100A provided through server 153A directs the operations of first application version 100A performed on first portion actual user data traffic 107 and generates first users' results data 102A.

In one embodiment, the second portion of the user traffic is processed in the production environment using the second version of the application. In one embodiment, as a result of the processing by the second version of the application in the production environment, the second portion of the actual user data is transformed into second users' results data. That is to say, the second portion of the actual user data is processed by the second version of the application in the production environment, and using each of the identical and actual production environment components used by the second version of the application to process any user data.

As a specific illustrative example, in the case where the application is a financial management system, the second portion of the actual user data is processed by the second version of the application to produce second user results data, in one embodiment, in the form of the one or more specific financial reports generated using the second portion of the actual user data. As another specific illustrative example, in the case where the application is a tax preparation system, the second portion of the actual user data is processed by the second version of the application to transform the second portion of the actual user data to second results data taking the form, in this specific illustrative example, of one or more completed tax filing forms, such as a 1040 tax form.

In the specific illustrative example of FIG. 1, A/B manager 161 routes a second portion of actual user data, such as user data traffic 109, to second application version 100B and server 153B where the second portion of actual user data, such as user data traffic 109, is processed using second application version 100B and server 153B to generate second users' results data 102B.

As seen in FIG. 1, in one embodiment, processing module 101B of second application version 100B provided on server 153B directs the operations of application version 100B performed on second portion actual user data traffic 109 and generates second users' results data 102B.

In one embodiment, at least the second users' results data is then analyzed to evaluate the production environment and/or operation of the second version of the application in the production environment.

As noted above, in various embodiments, the first and second versions of the application represent two different, but similar, applications. In various embodiments, the first and second versions of the application represent two different releases/versions of an application each having different feature sets. In various embodiments, the first and second versions of the application represent a first, older, version of an application and a second, newer, or modified, version of the application, each having different feature sets. In various embodiments, the first and second versions of the applications represent any two applications that differ in one or more respects/aspects, as discussed herein, and/or as known in the art at the time of filing, and/or as identified after the time of filing.

In one embodiment, one or the other of the first or second versions of the application include new, or different features that are being "field" tested to determine customer preference for the different features. Consequently, in one embodiment, the results data includes customer feedback data regarding the different features. In one embodiment, the customer feedback is specifically solicited via one or more types of customer feedback mechanisms.

In addition, in one embodiment, both the first users' results data and the second users' results data are analyzed and/or compared to evaluate the production environment and/or operation, and/or desirability of features, of the first version of the application and the second version of the application, as implemented in the production environment. Consequently, in one embodiment, both the first users' results data and the second users' results data includes customer feedback data regarding the different features. In one embodiment, the customer feedback is specifically solicited via one or more types of customer feedback mechanisms for each version.

In addition, while herein embodiments including two versions of an application are discussed, those of skill in the art will readily recognize that, in various embodiments, any number of versions of an application can be accommodated and benefit from the use of the methods and systems for comparing different versions of a cloud based application in a production environment using segregated backend systems.

Returning to FIG. 1, process module 154A includes analysis module 155A which analyzes first users' results data 102A and generates analysis data 156A indicating the results of the evaluation of the security and operation/function of first application version 100A in production environment 1 and the security and operation/function of production environment 1 itself and/or customer feedback.

Likewise, process module 154B includes analysis module 155B which analyzes second users' results data 102B and generates analysis data 156B indicating the results of the evaluation of the security and operation/function of first application version 100 in production environment 1 and the security and operation/function of production environment 1 itself, and/or customer feedback.

Using the methods and systems for comparing two versions of a cloud based application in a production environment using segregated backend systems discussed above, an application can be tested using fabricated user data in the actual production environment in which the application is deployed, implemented, accessed, and used.

In addition, using the methods and systems for comparing two versions of a cloud based application in a production environment using segregated backend systems discussed above, the fabricated user data is routed to a backend system that is similar to, or identical to, the backend system to which actual user data is routed. In this way the processing of actual user data and fabricated user data is performed by the application in the production environment and using the identical in production environment components with the exception of the similar/identical and segregated backend systems. As a result, testing of the application using fabricated user data is accomplished in the actual production environment without risking actual user data and/or any data crossover issues.

Consequently, using the methods and systems for comparing two versions of a cloud based application in a production environment using segregated backend systems discussed above, applications can be accurately tested for vulnerabilities and behavior in their actual production environments, and even after they have been deployed and are operating in their production environments; all without risking actual user data. Therefore, the methods and systems for comparing two versions of a cloud based application in a production environment using segregated backend systems discussed above, provide for more secure cloud-based applications, particularly Internet facing cloud-based implemented applications.

In one embodiment, the application is tested in the actual production environment using the fabricated user data prior to providing actual user data to the application in the production environment, and/or prior to enabling various components and capabilities associated with the application in the production environment, i.e., prior to a fully enabled launch of the application in the production environment. As an example, in one embodiment, the application is tested in the actual production environment using the fabricated user data prior to providing Domain Name Service (DNS) servers access to the application.

To this end, in one embodiment, a given application is implemented in the production environment in which the application will be actually deployed, implemented, accessed, and used, as that application is intended to be used.

Consequently, in one embodiment the application is implemented in the production environment to utilize all of the production environment components that are combined; communicatively coupled; virtually and/or physically connected; and/or associated with one another, to provide the production environment implementing the application.

As specific illustrative examples, the application is implemented using, and including, the actual production environment components such as, but not limited to, the one or more computing environments to actually be used to implement the application in the production environment such as a data center, a cloud computing environment, and/or one or more other computing environments in which one or more components and/or services to actually be used to implement the application in the production environment are implemented; the one or more computing systems or computing entities to actually be used to implement the application in the production environment; the one or more virtual assets to actually be used to implement the application in the production environment; the one or more supervisory or control systems, such as hypervisors, to actually be used to implement the application in the production environment; the one or more communications channels to actually be used to implement the application in the production environment; the one or more access control systems, such as firewalls and gateways, to actually be used to implement the application in the production environment; the one or more routing systems, such as routers and switches, to actually be used to implement the application in the production environment; the one or more communications endpoint proxy systems, such as load balancers or buffers, to actually be used to implement the application in the production environment; the one or more traffic and/or access control systems to actually be used to implement the application in the production environment; the one or more secure communication protocols and/or endpoints, such as Secure Sockets Layer (SSL) protocols, to actually be used to implement the application in the production environment; the one or more databases to actually be used to implement the application in the production environment; the one or more internal or external services to actually be used to implement the application in the production environment; the one or more backend servers or other hardware to actually be used to implement the application in the production environment; the one or more software systems to actually be used to implement the application in the production environment; and/or any other components making up the actual production environment in which an application is to be deployed, implemented, and run, as discussed herein, and/or as known in the art at the time of filing, and/or as developed after the time of filing.

In one embodiment, fabricated user data associated with the application is generated.

In one embodiment, the fabricated user data is data similar to actual user data that would be generated by real, or "actual" users and provided to the application for processing. As a specific illustrative example, in the case where the application is a financial management system, the fabricated user data would include data replicating financial data as it would be retrieved from various user accounts associated with an actual user. As another specific illustrative example, in the case where the application is a tax-preparation system, the fabricated user data would include personal and financial data associated with the fictitious, i.e., fabricated, user that is similar to data that would be generated by an actual user.

In one embodiment, the fabricated user data is generated by obtaining actual user data and then processing the actual user data to remove all personal and identification data such as data identifying the actual user, data identifying accounts and access codes associated with the actual user, data indicating a location associated with the actual user data, and/or any other data that is considered sensitive and/or personal to an individual user.

In one embodiment, the fabricated user data is completely fabricated using actual user data models to replicate the form and volume of actual user data.

In various embodiments, the fabricated user data is obtained from any source of fabricated user data, as discussed herein, and/or as known in the art at the time of filing, and/or as developed after the time of filing.

In one embodiment, once the application is implemented in the production environment in which the application will actually be deployed, implemented, accessed, and used, as that application is intended to be used, and fabricated user data is generated, but before actual user data is provided to the application, and/or prior to enabling various components and capabilities associated with the application in the production environment, the fabricated user data is provided to the application in the production environment.

As noted, in one embodiment, the fabricated user data is provided to the application in the production environment before actual user data is provided to the application, and/or prior to enabling various components and capabilities associated with the application in the production environment.

In one embodiment, the fabricated user data is provided to the application in the production environment, before actual user data is provided to the application, and/or prior to enabling various components and capabilities associated with the application in the production environment, using a communications channel or data transfer mechanism that is separate from the communications channel used to provide actual user data to the application, but which uses the production environment components provided in the production environment.

In one embodiment, the fabricated user data is provided to the application in the production environment, but before actual user data is provided to the application, and/or prior to enabling various components and capabilities associated with the application in the production environment, using the same communications channel used to provide actual user data to the application in the production environment.

In one embodiment, as a result of the processing by the application in the production environment of the fabricated user data, the fabricated user data is transformed into fabricated user results data. That is to say, the fabricated user data is processed by the application in the same manner as any other user data would be processed by the application in the production environment, and using each of the identical and actual production environment components used by the application to process any user data, whether fabricated or actual.

As a specific illustrative example, in the case where the application is a financial management system, the fabricated user data is processed by the application to produce fabricated user results data, in one embodiment, in the form of the one or more specific financial reports generated using the fabricated user data. As another specific illustrative example, in the case where the application is a tax preparation system, the fabricated user data is processed by the application to transform the fabricated user data to produce results data taking the form, in this specific illustrative example, of one or more completed tax filing forms, such as a 1040 tax form.

In one embodiment, the fabricated user results data and the application operational data, along with the performance/function data for the application in the production environment, is analyzed to evaluate the security and operation/function of the application in the production environment and the security and operation/function of the production environment itself.

In one embodiment, once the fabricated user results data is analyzed, if a determination is made that the application is operating satisfactorily in the production environment, then, and only then, is actual user data provided to the application, and/or various components and capabilities associated with the application in the production environment are enabled, and the application is fully implemented or launched in the production environment for use by actual users.

Using the methods and systems for comparing two versions of a cloud based application in a production environment using segregated backend systems discussed above, an application can be tested using fabricated user data in the actual production environment in which the application is to be deployed, implemented, accessed, and used, prior to providing actual data, and/or full application capabilities, to the application.

Consequently, using the methods and systems for comparing two versions of a cloud based application in a production environment using segregated backend systems discussed above, applications can be accurately tested for vulnerabilities and behavior in their actual production environments, prior to providing actual data, and/or full application capabilities, to the application, and without risking actual user data. Therefore, the methods and systems for comparing two versions of a cloud based application in a production environment using segregated backend systems discussed above, provide for more secure cloud-based applications, particularly Internet facing cloud-based implemented applications.

Process

In accordance with one embodiment, a method and system for comparing two versions of a cloud based application in a production environment using segregated backend systems includes implementing an application in the production environment in which the application will actually be used and accessed. In one embodiment, two or more backend systems are used to provide two identical versions of the application using the production environment in which the application will actually be used and accessed.

In one embodiment, fabricated user data associated with the application implemented in the production environment is then generated. In one embodiment, actual user data is also received. In one embodiment, the actual user data is routed and processed in the production environment using a first backend system of the two or more backend systems. In one embodiment, the fabricated user data is also routed and processed in the production environment but using a second backend system of the two or more backend systems.

In one embodiment, the actual user data is then processed by the application in the production environment using the first backend system of the two or more backend systems to transform the actual user data into actual user results data.

In one embodiment, the fabricated user data is also processed by the application in the production environment, but using the second backend system of the two or more backend systems to transform the fabricated user data into fabricated user results data.

In one embodiment, the fabricated user results data is then analyzed to evaluate the production environment and/or operation of the application in the production environment.

Figure 2:
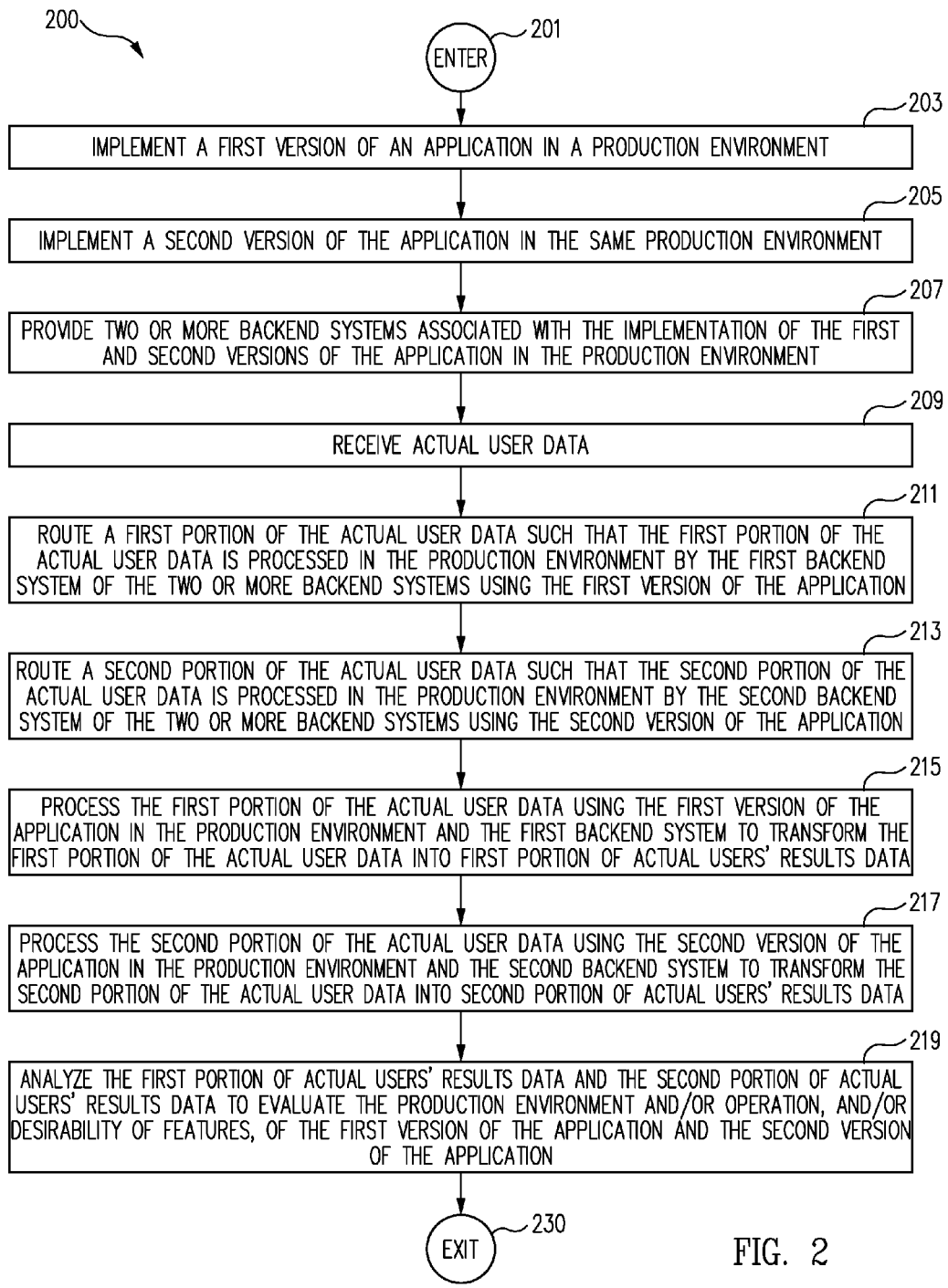
FIG. 2 is a flow chart depicting a process for comparing different versions of a cloud based application in a production environment using segregated backend systems in accordance with one embodiment.

FIG. 2 is a flow chart of a process 200 for comparing two versions of a cloud based application in a production environment using segregated backend systems in accordance with one embodiment. In one embodiment, process 200 for comparing two versions of a cloud based application in a production environment using segregated backend systems begins at ENTER OPERATION 201 of FIG. 2 and process flow proceeds to IMPLEMENT A FIRST VERSION OF AN APPLICATION IN A PRODUCTION ENVIRONMENT OPERATION 203.

In one embodiment, at IMPLEMENT A FIRST VERSION OF AN APPLICATION IN A PRODUCTION ENVIRONMENT OPERATION 203 a first version of a given application is implemented in the production environment in which the first version of the application will be, or is, actually deployed, implemented, accessed, and used, as the first version of the application is intended to be used.

In one embodiment, the first version of the application is implemented at IMPLEMENT A FIRST VERSION OF AN APPLICATION IN A PRODUCTION ENVIRONMENT OPERATION 203 in the production environment to utilize all of the production environment components that are combined; communicatively coupled; virtually and/or physically connected; and/or associated with one another, to provide the production environment implementing the first version of application.

In one embodiment, once a first version of a given application is implemented in the production environment in which the first version of the application will be, or is, actually deployed, implemented, accessed, and used, as the first version of the application is intended to be used at IMPLEMENT A FIRST VERSION OF AN APPLICATION IN A PRODUCTION ENVIRONMENT OPERATION 203, process flow proceeds to IMPLEMENT A SECOND VERSION OF THE APPLICATION IN THE SAME PRODUCTION ENVIRONMENT OPERATION 205.

In one embodiment, at IMPLEMENT A SECOND VERSION OF THE APPLICATION IN THE SAME PRODUCTION ENVIRONMENT OPERATION 205 a second version of the application of IMPLEMENT A FIRST VERSION OF AN APPLICATION IN A PRODUCTION ENVIRONMENT OPERATION 203 is implemented in the same production environment of IMPLEMENT A FIRST VERSION OF AN APPLICATION IN A PRODUCTION ENVIRONMENT OPERATION 203 in which both the first version of the application and the second version of the application will be, or are, actually deployed, implemented, accessed, and used, as first version of the application and the second version of the application are intended to be used.

As specific illustrative examples, in one embodiment, at IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205, both the first version of the application and the second version of the application are implemented using, and including, the actual production environment components such as, but not limited to, the one or more computing environments to actually be used to implement the first and second versions of the application in the production environment such as a data center, a cloud computing environment, and/or one or more other computing environments in which one or more components and/or services to actually be used to implement the first and second versions of the application in the production environment are implemented; the one or more computing systems or computing entities to actually be used to implement the first and second versions of the application in the production environment; the one or more virtual assets to actually be used to implement the first and second versions of the application in the production environment; the one or more supervisory or control systems, such as hypervisors, to actually be used to implement the first and second versions of the application in the production environment; the one or more communications channels to actually be used to implement the first and second versions of the application in the production environment; the one or more access control systems, such as firewalls and gateways, to actually be used to implement the first and second versions of the application in the production environment; the one or more routing systems, such as routers and switches, to actually be used to implement the first and second versions of the application in the production environment; the one or more communications endpoint proxy systems, such as load balancers or buffers, to actually be used to implement the first and second versions of the application in the production environment; the one or more traffic and/or access control systems to actually be used to implement the first and second versions of the application in the production environment; the one or more secure communication protocols and/or endpoints, such as Secure Sockets Layer (SSL) protocols, to actually be used to implement the first and second versions of the application in the production environment; the one or more databases to actually be used to implement the first and second versions of the application in the production environment; the one or more internal or external services to actually be used to implement the first and second versions of the application in the production environment; the one or more backend servers or other hardware to actually be used to implement the first and second versions of the application in the production environment; the one or more software systems to actually be used to implement the first and second versions of the application in the production environment; and/or any other components making up the actual production environment in which the first and second versions of the application are to be deployed, implemented, and run, as discussed herein, and/or as known in the art at the time of filing, and/or as developed after the time of filing.

In various embodiments, the first and second versions of the applications of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 represent two different, but similar, applications.

In various embodiments, the first and second versions of the applications of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 represent two different releases/versions of an application each having different feature sets.

In various embodiments, the first and second versions of the applications of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 represent a first, older, version of an application and a second, newer, or modified, version of the application, each having different feature sets.

In various embodiments, the first and second versions of the applications of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 represent any two applications that differ in one or more respects/aspects, as discussed herein, and/or as known in the art at the time of filing, and/or as identified after the time of filing.

In addition, while herein embodiments including two versions of an application are discussed, those of skill in the art will readily recognize that, in various embodiments, any number of versions of an application can be accommodated and benefit from the use of process 200 for comparing two versions of a cloud based application in a production environment using segregated backend systems.

In one embodiment, once a first version of the application and a second version of the application are implemented in the same production environment in which both the first version of the application and the second version of the application will be, or are, actually deployed, implemented, accessed, and used, as first and second versions of the application are intended to be used at IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205, process flow proceeds to PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207.

In one embodiment, at PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207, a separate backend system, or portion of a backend system, is provided for each version of the application implemented in the production environment of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205.

In one embodiment, the backend systems provided at PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207 are backend server systems.

In one embodiment, the backend systems are provided at PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207 in a trusted computing environment, such as a data center that is part of the production environment of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205.

In one embodiment, once a separate backend system, or portion of a backend system, is provided for each version of the application implemented in the production environment of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 at PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207, process flow proceeds to RECEIVE ACTUAL USER DATA OPERATION 209.

In one embodiment, at RECEIVE ACTUAL USER DATA OPERATION 209 actual user data traffic is received in the production environment for processing by one or the other of the two versions of the application of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205.

As used herein the term "user" includes any party, parties, and/or entities, including computing systems, computing entities, other applications, software, and/or hardware, and/or any other data source, as discussed herein, and/or as known in the art at the time of filing, and/or as developed after the time of filing, from which data is obtained for processing by an application.

In one embodiment, once at RECEIVE ACTUAL USER DATA OPERATION 209 actual user data traffic is received in the production environment for processing by one or the other of the two versions of the application of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 at RECEIVE ACTUAL USER DATA OPERATION 209, process flow proceeds to ROUTE A FIRST PORTION OF THE ACTUAL USER DATA SUCH THAT THE FIRST PORTION OF THE ACTUAL USER DATA IS PROCESSED BY THE FIRST VERSION OF THE APPLICATION IN THE PRODUCTION ENVIRONMENT USING THE FIRST BACKEND SYSTEM OF THE TWO OR MORE BACKEND SYSTEMS OPERATION 211.

In one embodiment, at ROUTE A FIRST PORTION OF THE ACTUAL USER DATA SUCH THAT THE FIRST PORTION OF THE ACTUAL USER DATA IS PROCESSED BY THE FIRST VERSION OF THE APPLICATION IN THE PRODUCTION ENVIRONMENT USING THE FIRST BACKEND SYSTEM OF THE TWO OR MORE BACKEND SYSTEMS OPERATION 211 a first portion of the actual user data traffic of RECEIVE ACTUAL USER DATA OPERATION 209 representing user data from a first subset of users is routed to the first version of the application of IMPLEMENT A FIRST VERSION OF AN APPLICATION IN A PRODUCTION ENVIRONMENT OPERATION 203 and a first backend system of the two or more backend systems of PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207 for processing.

In one embodiment, the first portion of the actual user data traffic of ROUTE A FIRST PORTION OF THE ACTUAL USER DATA SUCH THAT THE FIRST PORTION OF THE ACTUAL USER DATA IS PROCESSED BY THE FIRST VERSION OF THE APPLICATION IN THE PRODUCTION ENVIRONMENT USING THE FIRST BACKEND SYSTEM OF THE TWO OR MORE BACKEND SYSTEMS OPERATION 211 is determined based on one or more routing factors such as, but not limited to, an actual user type associated with the actual user data traffic; an actual user location associated with the actual user data traffic; an IP address associated with the actual user data traffic; header data included in the actual user data traffic; a status of an actual user associated with the actual user data traffic, and/or any other routing factors, or combination of routing factors, as discussed herein, and/or as known in the art at the time of filing, and/or as developed after the time of filing.

In one embodiment, once a first portion of the actual user data traffic of RECEIVE ACTUAL USER DATA OPERATION 209 representing user data from a first subset of users is routed to the first version of the application of IMPLEMENT A FIRST VERSION OF AN APPLICATION IN A PRODUCTION ENVIRONMENT OPERATION 203 and a first backend system of the two or more backend systems of PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207 for processing at ROUTE A FIRST PORTION OF THE ACTUAL USER DATA SUCH THAT THE FIRST PORTION OF THE ACTUAL USER DATA IS PROCESSED BY THE FIRST VERSION OF THE APPLICATION IN THE PRODUCTION ENVIRONMENT USING THE FIRST BACKEND SYSTEM OF THE TWO OR MORE BACKEND SYSTEMS OPERATION 211, process flow proceeds to ROUTE A SECOND PORTION OF THE ACTUAL USER DATA SUCH THAT THE SECOND PORTION OF THE ACTUAL USER DATA IS PROCESSED BY THE SECOND VERSION OF THE APPLICATION IN THE PRODUCTION ENVIRONMENT USING THE SECOND BACKEND SYSTEM OF THE TWO OR MORE BACKEND SYSTEMS OPERATION 213.

In one embodiment, at ROUTE A SECOND PORTION OF THE ACTUAL USER DATA SUCH THAT THE SECOND PORTION OF THE ACTUAL USER DATA IS PROCESSED BY THE SECOND VERSION OF THE APPLICATION IN THE PRODUCTION ENVIRONMENT USING THE SECOND BACKEND SYSTEM OF THE TWO OR MORE BACKEND SYSTEMS OPERATION 213 a second portion of the actual user data traffic of RECEIVE ACTUAL USER DATA OPERATION 209 representing user data from a second subset of users is routed to the second version of the application of IMPLEMENT A SECOND VERSION OF THE APPLICATION IN THE SAME PRODUCTION ENVIRONMENT OPERATION 205 and a second backend system of the two or more backend systems of PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207 for processing.

In one embodiment, the second portion of the actual user data traffic of ROUTE A SECOND PORTION OF THE ACTUAL USER DATA SUCH THAT THE SECOND PORTION OF THE ACTUAL USER DATA IS PROCESSED BY THE SECOND VERSION OF THE APPLICATION IN THE PRODUCTION ENVIRONMENT USING THE SECOND BACKEND SYSTEM OF THE TWO OR MORE BACKEND SYSTEMS OPERATION 213 is determined based on one or more routing factors such as, but not limited to, an actual user type associated with the actual user data traffic; an actual user location associated with the actual user data traffic; an IP address associated with the actual user data traffic; header data included in the actual user data traffic; a status of an actual user associated with the actual user data traffic, and/or any other routing factors, or combination of routing factors, as discussed herein, and/or as known in the art at the time of filing, and/or as developed after the time of filing.

In one embodiment, once a second portion of the actual user data traffic of RECEIVE ACTUAL USER DATA OPERATION 209 representing user data from a second subset of users is routed to the second version of the application of IMPLEMENT A SECOND VERSION OF THE APPLICATION IN THE SAME PRODUCTION ENVIRONMENT OPERATION 205 and a second backend system of the two or more backend systems of PROVIDE TWO OR MORE BACKEND SYSTEMS ASSOCIATED WITH THE IMPLEMENTATION OF THE FIRST AND SECOND VERSIONS OF THE APPLICATION IN THE PRODUCTION ENVIRONMENT OPERATION 207 for processing at ROUTE A SECOND PORTION OF THE ACTUAL USER DATA SUCH THAT THE SECOND PORTION OF THE ACTUAL USER DATA IS PROCESSED BY THE SECOND VERSION OF THE APPLICATION IN THE PRODUCTION ENVIRONMENT USING THE SECOND BACKEND SYSTEM OF THE TWO OR MORE BACKEND SYSTEMS OPERATION 213, process flow proceeds to PROCESS THE FIRST PORTION OF THE ACTUAL USER DATA USING THE FIRST VERSION OF THE APPLICATION IN THE PRODUCTION ENVIRONMENT AND THE FIRST BACKEND SYSTEM TO TRANSFORM THE FIRST PORTION OF THE ACTUAL USER DATA INTO FIRST USERS' RESULTS DATA OPERATION 215.

In one embodiment, at PROCESS THE FIRST PORTION OF THE ACTUAL USER DATA USING THE FIRST VERSION OF THE APPLICATION IN THE PRODUCTION ENVIRONMENT AND THE FIRST BACKEND SYSTEM TO TRANSFORM THE FIRST PORTION OF THE ACTUAL USER DATA INTO FIRST USERS' RESULTS DATA OPERATION 215 the first portion of the user traffic of ROUTE A FIRST PORTION OF THE ACTUAL USER DATA SUCH THAT THE FIRST PORTION OF THE ACTUAL USER DATA IS PROCESSED BY THE FIRST VERSION OF THE APPLICATION IN THE PRODUCTION ENVIRONMENT USING THE FIRST BACKEND SYSTEM OF THE TWO OR MORE BACKEND SYSTEMS OPERATION 211 is processed in the production environment using the first version of the application of IMPLEMENT A FIRST VERSION OF AN APPLICATION IN A PRODUCTION ENVIRONMENT OPERATION 203.

In one embodiment, as a result of the processing by the first version of the application in the production environment at PROCESS THE FIRST PORTION OF THE ACTUAL USER DATA USING THE FIRST VERSION OF THE APPLICATION IN THE PRODUCTION ENVIRONMENT AND THE FIRST BACKEND SYSTEM TO TRANSFORM THE FIRST PORTION OF THE ACTUAL USER DATA INTO FIRST USERS' RESULTS DATA OPERATION 215, the first portion of the actual user data is transformed into first users' results data. That is to say, the first portion of the actual user data is processed by the first version of the application in the production environment, and using each of the identical and actual production environment components used by the first version of the application to process any user data.

As a specific illustrative example, in the case where the application of IMPLEMENT A FIRST VERSION OF AN APPLICATION IN A PRODUCTION ENVIRONMENT OPERATION 203 is a financial management system, the first portion of the actual user data is processed by the first version of the application to produce first user results data, in one embodiment, in the form of the one or more specific financial reports generated using the first portion of the actual user data.

As another specific illustrative example, in the case where the application of IMPLEMENT A FIRST VERSION OF AN APPLICATION IN A PRODUCTION ENVIRONMENT OPERATION 203 is a tax preparation system, the first portion of the actual user data is processed by the first version of the application to transform the first portion of the actual user data into first results data taking the form, in this specific illustrative example, of one or more completed tax filing forms, such as a 1040 tax form.

In one embodiment, once the first portion of the user traffic of ROUTE A FIRST PORTION OF THE ACTUAL USER DATA SUCH THAT THE FIRST PORTION OF THE ACTUAL USER DATA IS PROCESSED BY THE FIRST VERSION OF THE APPLICATION IN THE PRODUCTION ENVIRONMENT USING THE FIRST BACKEND SYSTEM OF THE TWO OR MORE BACKEND SYSTEMS OPERATION 211 is processed in the production environment using the first version of the application of IMPLEMENT A FIRST VERSION OF AN APPLICATION IN A PRODUCTION ENVIRONMENT OPERATION 203 at PROCESS THE FIRST PORTION OF THE ACTUAL USER DATA USING THE FIRST VERSION OF THE APPLICATION IN THE PRODUCTION ENVIRONMENT AND THE FIRST BACKEND SYSTEM TO TRANSFORM THE FIRST PORTION OF THE ACTUAL USER DATA INTO FIRST USERS' RESULTS DATA OPERATION 215, process flow proceeds to PROCESS THE SECOND PORTION OF THE ACTUAL USER DATA USING THE SECOND VERSION OF THE APPLICATION IN THE PRODUCTION ENVIRONMENT AND THE SECOND BACKEND SYSTEM TO TRANSFORM THE SECOND PORTION OF THE ACTUAL USER DATA INTO SECOND USERS' RESULTS DATA OPERATION 217.

In one embodiment, at PROCESS THE SECOND PORTION OF THE ACTUAL USER DATA USING THE SECOND VERSION OF THE APPLICATION IN THE PRODUCTION ENVIRONMENT AND THE SECOND BACKEND SYSTEM TO TRANSFORM THE SECOND PORTION OF THE ACTUAL USER DATA INTO SECOND USERS' RESULTS DATA OPERATION 217 the second portion of the user traffic of ROUTE A SECOND PORTION OF THE ACTUAL USER DATA SUCH THAT THE SECOND PORTION OF THE ACTUAL USER DATA IS PROCESSED BY THE SECOND VERSION OF THE APPLICATION IN THE PRODUCTION ENVIRONMENT USING THE SECOND BACKEND SYSTEM OF THE TWO OR MORE BACKEND SYSTEMS OPERATION 213 is processed in the production environment using the second version of the application of IMPLEMENT A SECOND VERSION OF THE APPLICATION IN THE SAME PRODUCTION ENVIRONMENT OPERATION 205.

In one embodiment, as a result of the processing by the second version of the application in the production environment at PROCESS THE SECOND PORTION OF THE ACTUAL USER DATA USING THE SECOND VERSION OF THE APPLICATION IN THE PRODUCTION ENVIRONMENT AND THE SECOND BACKEND SYSTEM TO TRANSFORM THE SECOND PORTION OF THE ACTUAL USER DATA INTO SECOND USERS' RESULTS DATA OPERATION 217, the second portion of the actual user data is transformed into second users' results data. That is to say, the second portion of the actual user data is processed by the second version of the application in the production environment, and using each of the identical and actual production environment components used by the second version of the application to process any user data.

As a specific illustrative example, in the case where the application of IMPLEMENT A SECOND VERSION OF THE APPLICATION IN THE SAME PRODUCTION ENVIRONMENT OPERATION 205 is a financial management system, the second portion of the actual user data is processed by the second version of the application to produce second user results data, in one embodiment, in the form of the one or more specific financial reports generated using the second portion of the actual user data.

As another specific illustrative example, in the case where the application of IMPLEMENT A SECOND VERSION OF THE APPLICATION IN THE SAME PRODUCTION ENVIRONMENT OPERATION 205 is a tax preparation system, the second portion of the actual user data is processed by the second version of the application to transform the second portion of the actual user data to second results data taking the form, in this specific illustrative example, of one or more completed tax filing forms, such as a 1040 tax form.

In one embodiment, once the second portion of the user traffic of ROUTE A SECOND PORTION OF THE ACTUAL USER DATA SUCH THAT THE SECOND PORTION OF THE ACTUAL USER DATA IS PROCESSED BY THE SECOND VERSION OF THE APPLICATION IN THE PRODUCTION ENVIRONMENT USING THE SECOND BACKEND SYSTEM OF THE TWO OR MORE BACKEND SYSTEMS OPERATION 213 is processed in the production environment using the second version of the application of IMPLEMENT A SECOND VERSION OF THE APPLICATION IN THE SAME PRODUCTION ENVIRONMENT OPERATION 205 at PROCESS THE SECOND PORTION OF THE ACTUAL USER DATA USING THE SECOND VERSION OF THE APPLICATION IN THE PRODUCTION ENVIRONMENT AND THE SECOND BACKEND SYSTEM TO TRANSFORM THE SECOND PORTION OF THE ACTUAL USER DATA INTO SECOND USERS' RESULTS DATA OPERATION 217, process flow proceeds to ANALYZE THE FIRST ACTUAL USERS' RESULTS DATA AND THE SECOND ACTUAL USERS' RESULTS DATA TO EVALUATE THE PRODUCTION ENVIRONMENT AND/OR OPERATION, AND/OR DESIRABILITY OF FEATURES, OF THE FIRST VERSION OF THE APPLICATION AND THE SECOND VERSION OF THE APPLICATION OPERATION 219.

In one embodiment, at ANALYZE THE FIRST ACTUAL USERS' RESULTS DATA AND THE SECOND ACTUAL USERS' RESULTS DATA TO EVALUATE THE PRODUCTION ENVIRONMENT AND/OR OPERATION, AND/OR DESIRABILITY OF FEATURES, OF THE FIRST VERSION OF THE APPLICATION AND THE SECOND VERSION OF THE APPLICATION OPERATION 219 at least the second users' results data of PROCESS THE SECOND PORTION OF THE ACTUAL USER DATA USING THE SECOND VERSION OF THE APPLICATION IN THE PRODUCTION ENVIRONMENT AND THE SECOND BACKEND SYSTEM TO TRANSFORM THE SECOND PORTION OF THE ACTUAL USER DATA INTO SECOND USERS' RESULTS DATA OPERATION 217 is analyzed to evaluate the production environment and/or operation of the second version of the application of IMPLEMENT A SECOND VERSION OF THE APPLICATION IN THE SAME PRODUCTION ENVIRONMENT OPERATION 205 in the production environment.

As noted above, in various embodiments, the first and second versions of the application of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 represent two different, but similar, applications.

In various embodiments, the first and second versions of the application of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 represent two different releases/versions of an application each having different feature sets.

In various embodiments, the first and second versions of the application of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 represent a first, older, version of an application and a second, newer, or modified, version of the application, each having different feature sets.

In various embodiments, the first and second versions of the applications of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 represent any two applications that differ in one or more respects/aspects, as discussed herein, and/or as known in the art at the time of filing, and/or as identified after the time of filing.

In one embodiment, one or the other of the first or second versions of the application of IMPLEMENT A FIRST VERSION OF AN APPLICATION IN A PRODUCTION ENVIRONMENT OPERATION 203 and IMPLEMENT A SECOND VERSION OF THE APPLICATION IN THE SAME PRODUCTION ENVIRONMENT OPERATION 205 include new, or different features that are being "field" tested to determine customer preference for the different features. Consequently, in one embodiment, the results data of PROCESS THE SECOND PORTION OF THE ACTUAL USER DATA USING THE SECOND VERSION OF THE APPLICATION IN THE PRODUCTION ENVIRONMENT AND THE SECOND BACKEND SYSTEM TO TRANSFORM THE SECOND PORTION OF THE ACTUAL USER DATA INTO SECOND USERS' RESULTS DATA OPERATION 217 includes customer feedback data regarding the different features. In one embodiment, the customer feedback is specifically solicited via one or more types of customer feedback mechanisms.

In addition, in one embodiment, both the first users' results data of PROCESS THE FIRST PORTION OF THE ACTUAL USER DATA USING THE FIRST VERSION OF THE APPLICATION IN THE PRODUCTION ENVIRONMENT AND THE FIRST BACKEND SYSTEM TO TRANSFORM THE FIRST PORTION OF THE ACTUAL USER DATA INTO FIRST USERS' RESULTS DATA OPERATION 215 and the second users' results data of PROCESS THE SECOND PORTION OF THE ACTUAL USER DATA USING THE SECOND VERSION OF THE APPLICATION IN THE PRODUCTION ENVIRONMENT AND THE SECOND BACKEND SYSTEM TO TRANSFORM THE SECOND PORTION OF THE ACTUAL USER DATA INTO SECOND USERS' RESULTS DATA OPERATION 217 are analyzed and/or compared at ANALYZE THE FIRST ACTUAL USERS' RESULTS DATA AND THE SECOND ACTUAL USERS' RESULTS DATA TO EVALUATE THE PRODUCTION ENVIRONMENT AND/OR OPERATION, AND/OR DESIRABILITY OF FEATURES, OF THE FIRST VERSION OF THE APPLICATION AND THE SECOND VERSION OF THE APPLICATION OPERATION 219 to evaluate the production environment and/or operation, and/or desirability of features, of the first version of the application and the second version of the application, as implemented in the production environment. Consequently, in one embodiment, both the first users' results data and the second users' results data includes customer feedback data regarding the different features. In one embodiment, the customer feedback is specifically solicited via one or more types of customer feedback mechanisms for each version.

In addition, while herein embodiments including two versions of an application are discussed, those of skill in the art will readily recognize that, in various embodiments, any number of versions of an application can be accommodated and benefit from the use of the methods and systems for comparing different versions of a cloud based application in a production environment using segregated backend systems.

In one embodiment, once at least the second users' results data of PROCESS THE SECOND PORTION OF THE ACTUAL USER DATA USING THE SECOND VERSION OF THE APPLICATION IN THE PRODUCTION ENVIRONMENT AND THE SECOND BACKEND SYSTEM TO TRANSFORM THE SECOND PORTION OF THE ACTUAL USER DATA INTO SECOND USERS' RESULTS DATA OPERATION 217 is analyzed to evaluate the production environment and/or operation of the second version of the application of IMPLEMENT A SECOND VERSION OF THE APPLICATION IN THE SAME PRODUCTION ENVIRONMENT OPERATION 205 in the production environment at ANALYZE THE FIRST ACTUAL USERS' RESULTS DATA AND THE SECOND ACTUAL USERS' RESULTS DATA TO EVALUATE THE PRODUCTION ENVIRONMENT AND/OR OPERATION, AND/OR DESIRABILITY OF FEATURES, OF THE FIRST VERSION OF THE APPLICATION AND THE SECOND VERSION OF THE APPLICATION OPERATION 219, process flow proceeds to EXIT OPERATION 230.

In one embodiment, at EXIT OPERATION 230 process 200 for comparing two versions of a cloud based application in a production environment using segregated backend systems is exited to await new data.

Using process 200 for comparing two versions of a cloud based application in a production environment using segregated backend systems, an application can be tested using fabricated user data in the actual production environment in which the application is deployed, implemented, accessed, and used.

In addition, process 200 for comparing two versions of a cloud based application in a production environment using segregated backend systems, the fabricated user data is routed to a backend system that is similar to, or identical to, the backend system to which actual user data is routed. In this way the processing of actual user data and fabricated user data is performed by the application in the production environment and using the identical in production environment components with the exception of the similar/identical and segregated backend systems. As a result, testing of the application using fabricated user data is accomplished in the actual production environment without risking actual user data and/or any data crossover issues.

Consequently, process 200 for comparing two versions of a cloud based application in a production environment using segregated backend systems, applications can be accurately tested for vulnerabilities and behavior in their actual production environments, and even after they have been deployed and are operating in their production environments; all without risking actual user data. Therefore, the methods and systems for comparing two versions of a cloud based application in a production environment using segregated backend systems discussed above, provide for more secure cloud-based applications, particularly Internet facing cloud-based implemented applications.

In accordance with one embodiment, a method and system for comparing two versions of a cloud based application in a production environment using segregated backend systems includes implementing a first version of an application and a second version of the application in the same production environment in which the first and second versions of application will actually be used and accessed. In one embodiment, two or more backend systems are used to implement the first and second versions of the application using the same production environment in which the first and second versions of application will actually be used and accessed.

In one embodiment, actual user data is received. In one embodiment, a first portion of the actual user data representing user data from a first portion of users is routed and processed in the production environment by the first backend system of the two or more backend systems using the first version of the application. In one embodiment, a second portion of the actual user data representing user data from a second portion of users is routed and processed in the production environment by a second backend system of the two or more backend systems using the second version of the application.

In one embodiment, the first portion of the actual user data is then processed by the first version of the application in the production environment using the first backend system of the two or more backend systems to transform the first portion of the actual user data into first portion of actual users' results data.

In one embodiment, the second portion of the actual user data is then processed by the second version of the application in the production environment using the second backend system of the two or more backend systems to transform the second portion of the actual user data into second portion of actual users' results data.

In one embodiment, the second portion of actual users' results data is then analyzed to evaluate the production environment and/or operation of the second version of the application in the production environment.

In one embodiment, the first portion of actual users' results data and the second portion of actual users' results data are also analyzed and/or compared to evaluate the production environment and/or operation, and/or desirability of features, of the first version of the application and the second version of the application, as implemented in the production environment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature often used in the art to identify equivalent operations.

Therefore, numerous variations, whether explicitly provided for by the specification or implied by the specification or not, may be implemented by one of skill in the art in view of this disclosure.

What is claimed is:

1. A system for comparing two versions of a cloud based application in a production environment using segregated backend systems comprising:
   at least one processor; and
   at least one memory coupled to the at least one processor, the at least one memory having stored therein instructions which when executed by any set of the one or more processors, perform a process for comparing two versions of a cloud based application in a production environment using segregated backend systems including:
   implementing a first version of an application in a production environment;
   implementing a second version of an application in the production environment, the second version differing from the first version;
   providing two or more backend systems associated with the respective implementations of the first and second versions of the application in the production environment;
   receiving actual user data of a plurality of users;
   determining a first portion of the actual user data based on one or more routing factors, the first portion including a subset of the received actual user data, the first portion including actual user data of a first group of users;
   routing the first portion of the actual user data to be processed by the first version of the application using a first backend system of the two or more backend systems;
   determining a second portion of the actual user data based on one or more routing factors, wherein the second portion of the actual user data is distinct from the first portion of the actual user data, the second portion including a subset of the received actual user data, the second portion including actual user data of a second group of users;
   routing the second portion to be processed by the second version of the application using a second backend system of the two or more backend systems;
   processing the first portion using the first version of the application in the production environment and the first backend system of the two or more backend systems to transform the first portion into first portion of actual users' results data;
   processing the second portion using the second version of the application in the production environment and the second backend system of the two or more backend systems to transform the second portion into second portion of actual users' results data; and
   analyzing the first portion of actual users results data and the second portion of actual users results data to evaluate the production environment and/or operation of the first and second versions of the application in the production environment.

2. The system for comparing two versions of the cloud based application in the production environment using the segregated backend systems of claim 1 wherein the production environment includes one or more production environment components selected from the group of production environment components consisting of:
   one or more computing environments used to implement the application in the production environment;
   one or more computing systems used to implement the application in the production environment;
   one or more virtual assets used to implement the application in the production environment;
   one or more hypervisors used to implement the application in the production environment;
   one or more communications channels used to implement the application in the production environment;
   one or more firewalls used to implement the application in the production environment;
   one or more routers used to implement the application in the production environment;
   one or more communications endpoint proxy systems used to implement the application in the production environment;
   one or more access control systems used to implement the application in the production environment;
   one or more load balancers used to implement the application in the production environment;
   one or more databases used to implement the application in the production environment; and
   one or more services used to implement the application in the production environment.

3. The system for comparing two versions of the cloud based application in the production environment using the segregated backend systems of claim 2 wherein at least one of the one or more computing environments used to implement the application in the production environment is a cloud-based computing environment.

4. The system for comparing two versions of the cloud based application in the production environment using the segregated backend systems of claim 2 wherein at least one of the one or more virtual assets used to implement the application in the production environment is selected from the group of the virtual assets consisting of:
   a virtual machine;
   a virtual server;
   a database or data store;
   an instance in a cloud environment;
   a cloud environment access system;
   part of a mobile device;
   part of a remote sensor;
   part of a server computing system; and
   part of a desktop computing system.

5. The system for comparing two versions of the cloud based application in the production environment using the segregated backend systems of claim 1 wherein the first portion of the actual user data is routed to be processed by the first version of the application using the first backend system and the second portion of the actual user data is routed to be processed by the second version of the application using the second backend system by an A/B routing system.

6. The system for comparing two versions of the cloud based application in the production environment using the segregated backend systems of claim 5 wherein at least one of the first backend system and/or the second backend system is a backend server.

7. The system for comparing two versions of the cloud based application in the production environment using the segregated backend systems of claim 1 further comprising:
analyzing the first portion of actual users' results data and the second portion of actual users' results data to compare and evaluate a desirability of features of the first version of the application and/or a desirability of features of the second version of the application, as implemented in the production environment.

8. The system for comparing two versions of the cloud based application in the production environment using the segregated backend systems of claim 7 wherein user feedback data is obtained and used to analyze the first portion of actual users' results data and the second portion of actual users' results data to compare and evaluate a desirability of features of the first version of the application and/or a desirability of features of the second version of the application, as implemented in the production environment.

9. The system for comparing two versions of the cloud based application in the production environment using the segregated backend systems of claim 1 wherein the one or more routing factors are selected from the group of routing factors consisting of:
an actual user type associated with the actual user data;
an actual user location associated with the actual user data;
an IP address associated with the actual user data;
header data included in the actual user data; and
a status of an actual user associated with the actual user data.

10. A system for comparing two versions of a cloud based application in a production environment using segregated backend systems comprising:
a production environment;
a first version of an application implemented in the production environment;
a second version of the application implemented in the production environment, the second version differing from the first version;
two or more segregated backend systems associated with respective ones of the first and second versions of the application in the production environment;
actual user data of a plurality of users, the actual user data associated with the application implemented in the production environment;
an A/B routing system;
at least one processor; and
at least one memory coupled to the at least one processor, the at least one memory having stored therein instructions which when executed by any set of the one or more processors, perform a process for comparing two versions of a cloud based application in a production environment using segregated backend systems including:
receiving the actual user data;
determining a first portion of the actual user data based on one or more routing factors, the first portion including a subset of the received actual user data, the first portion including actual user data of a first group of users;
routing the first portion of the actual user data to be processed by the first version of the application using a first backend system of the two or more backend systems;
determining a second portion of the actual user data based on one or more routing factors, the second portion of the actual user data originating from a second subset of users, wherein the second portion of the actual user data is distinct from the first portion of the actual user data, the second portion including a subset of the received actual user data, the second portion including actual user data of a second group of users;
routing the second portion of the actual user data representing user data from a second group of users to be processed by the second version of the application using a second backend system of the two or more backend systems;
processing the first portion using the first version of the application in the production environment and the first backend system of the two or more backend systems to transform the first portion into first portion of actual users' results data;
processing the second portion using the second version of the application in the production environment and the second backend system of the two or more backend systems to transform the second portion into second portion of actual users' results data; and
analyzing the first and second portions of actual users' results data to evaluate the production environment and/or operation of the first and second versions of the application in the production environment.

11. The system for comparing two versions of the cloud based application in the production environment using the segregated backend systems of claim 10 wherein the production environment includes one or more production environment components selected from the group of production environment components consisting of:
one or more computing environments used to implement the application in the production environment;
one or more computing systems used to implement the application in the production environment;
one or more virtual assets used to implement the application in the production environment;
one or more hypervisors used to implement the application in the production environment;
one or more communications channels used to implement the application in the production environment;
one or more firewalls used to implement the application in the production environment;
one or more routers used to implement the application in the production environment;
one or more communications endpoint proxy systems used to implement the application in the production environment;
one or more access control systems used to implement the application in the production environment;
one or more load balancers used to implement the application in the production environment;

one or more databases used to implement the application in the production environment; and one or more services used to implement the application in the production environment.

12. The system for comparing two versions of the cloud based application in the production environment using the segregated backend systems of claim 11 wherein at least one of the one or more computing environments used to implement the application in the production environment is a cloud-based computing environment.

13. The system for comparing two versions of the cloud based application in the production environment using the segregated backend systems of claim 11 wherein at least one of the one or more virtual assets used to implement the application in the production environment is selected from the group of the virtual assets consisting of:
  a virtual machine;
  a virtual server;
  a database or data store;
  an instance in a cloud environment;
  a cloud environment access system;
  part of a mobile device;
  part of a remote sensor;
  part of a server computing system; and
  part of a desktop computing system.

14. The system for comparing two versions of the cloud based application in the production environment using the segregated backend systems of claim 10 wherein the first portion of the actual user data is routed to be processed by the first version of the application using the first backend system and the second portion of the actual user data is routed to be processed by the second version of the application using the second backend system by an A/B routing system.

15. The system for comparing two versions of the cloud based application in the production environment using the segregated backend systems of claim 14 wherein at least one of the first backend system and/or the second backend system is a backend server.

16. The system for comparing two versions of the cloud based application in the production environment using the segregated backend systems of claim 10 further comprising:
  analyzing the first portion of actual users' results data and the second portion of actual users' results data to compare and evaluate a desirability of features of the first version of the application and/or a desirability of features of the second version of the application, as implemented in the production environment.

17. The system for comparing two versions of the cloud based application in the production environment using the segregated backend systems of claim 16 wherein user feedback data is obtained and used to analyze the first portion of actual users' results data and the second portion of actual users' results data to compare and evaluate a desirability of features of the first version of the application and/or a desirability of features of the second version of the application, as implemented in the production environment.

18. The system for comparing two versions of the cloud based application in the production environment using the segregated backend systems of claim 10 wherein the one or more routing factors are selected from the group of routing factors consisting of:
  an actual user type associated with the actual user data;
  an actual user location associated with the actual user data;
  an IP address associated with the actual user data;
  header data included in the actual user data; and
  a status of an actual user associated with the actual user data.

19. A method for comparing two versions of a cloud based application in a production environment using segregated backend systems comprising:
  implementing a first version of an application in the production environment;
  implementing a second version of the application in the production environment, the second version differing from the first version;
  providing two or more backend systems associated with the respective implementations of the first and second versions of the application in the production environment;
  receiving actual user data of a plurality of users;
  determining a first portion of the actual user data based on one or more routing factors, the first portion including a subset of the received actual user data, the first portion including actual user data of a first group of users;
  routing the first portion to be processed by the first version of the application using a first backend system of the two or more backend systems;
  determining a second portion based on one or more routing factors, wherein the second portion is distinct from the first portion of the actual user data;
  routing the second portion to be processed by the second version of the application using a second backend system of the two or more backend systems;
  processing the first portion using the first version of the application in the production environment and the first backend system of the two or more backend systems to transform the first portion into first portion of actual users' results data;
  processing the second portion using the second version of the application in the production environment and the second backend system of the two or more backend systems to transform the second portion into second portion of actual users' results data; and
  analyzing first portion of actual users results data and the second portion of actual users results data to evaluate the production environment and/or operation of the second version of the application in the production environment.

20. The method for comparing two versions of the cloud based application in the production environment using the segregated backend systems of claim 19 wherein the production environment includes one or more production environment components selected from the group of production environment components consisting of:
  one or more computing environments used to implement the application in the production environment;
  one or more computing systems used to implement the application in the production environment;
  one or more virtual assets used to implement the application in the production environment;
  one or more hypervisors used to implement the application in the production environment;
  one or more communications channels used to implement the application in the production environment;
  one or more firewalls used to implement the application in the production environment;
  one or more routers used to implement the application in the production environment;
  one or more communications endpoint proxy systems used to implement the application in the production environment;

one or more access control systems used to implement the application in the production environment;
one or more load balancers used to implement the application in the production environment;
one or more databases used to implement the application in the production environment; and
one or more services used to implement the application in the production environment.

21. The method for comparing two versions of the cloud based application in the production environment using the segregated backend systems of claim 20 wherein at least one of the one or more computing environments used to implement the application in the production environment is a cloud-based computing environment.

22. The method for comparing two versions of the cloud based application in the production environment using the segregated backend systems of claim 20 wherein at least one of the one or more virtual assets used to implement the application in the production environment is selected from the group of the virtual assets consisting of:
a virtual machine;
a virtual server;
a database or data store;
an instance in a cloud environment;
a cloud environment access system;
part of a mobile device;
part of a remote sensor;
part of a server computing system; and
part of a desktop computing system.

23. The method for comparing two versions of the cloud based application in the production environment using the segregated backend systems of claim 19 wherein the first portion of the actual user data is routed to be processed by the first version of the application using the first backend system and the second portion of the actual user data is routed to be processed by the second version of the application using the second backend system by an A/B routing system.

24. The method for comparing two versions of the cloud based application in the production environment using the segregated backend systems of claim 23 wherein at least one of the first backend system and/or the second backend system is a backend server.

25. The method for comparing two versions of the cloud based application in the production environment using the segregated backend systems of claim 23 wherein the one or more routing factors are selected from the group of routing factors consisting of:
an actual user type associated with the actual user data;
an actual user location associated with the actual user data;
an IP address associated with the actual user data;
header data included in the actual user data; and
a status of an actual user associated with the actual user data.

26. The method for comparing two versions of the cloud based application in the production environment using the segregated backend systems of claim 19 further comprising:
analyzing the first portion of actual users' results data and the second portion of actual users' results data to compare and evaluate a desirability of features of the first version of the application and/or a desirability of features of the second version of the application, as implemented in the production environment.

27. The method for comparing two versions of the cloud based application in the production environment using the segregated backend systems of claim 26 wherein user feedback data is obtained and used to analyze the first portion of actual users' results data and the second portion of actual users' results data to compare and evaluate a desirability of features of the first version of the application and/or a desirability of features of the second version of the application, as implemented in the production environment.

* * * * *